United States Patent [19]

Babel et al.

[11] Patent Number: 5,405,176
[45] Date of Patent: Apr. 11, 1995

[54] HIGH PRESSURE MECHANICAL SEAL

[75] Inventors: Henry W. Babel; Phillip L. Fuson; Colin D. Chickles, all of Huntington Beach; Cherie A. Jones, Westminster; Raymond H. Anderson, Santa Ana, all of Calif.

[73] Assignee: McDonnell Douglas Corporation, St. Louis, Mo.

[21] Appl. No.: 196,665

[22] Filed: Feb. 15, 1994

[51] Int. Cl.⁶ .................. B21D 39/04; F16L 35/00
[52] U.S. Cl. .................. 285/382; 285/382.2; 285/329; 29/458; 29/520
[58] Field of Search .......... 285/382, 382.1, 382.2, 285/329, 173, 422; 29/458, 508, 520

[56] References Cited

U.S. PATENT DOCUMENTS

| | | | |
|---|---|---|---|
| 271,026 | 1/1983 | Bradford | 285/92 |
| 2,741,498 | 4/1956 | Elliott | 285/329 |
| 3,062,568 | 11/1962 | Andresen et al. | 285/333 |
| 3,149,860 | 9/1964 | Hallesy | 285/382 |
| 3,287,034 | 11/1966 | Bragg | 285/382 |
| 3,474,519 | 10/1969 | Hallesy | 285/382 |
| 3,477,750 | 11/1969 | Powell | 285/382 |
| 3,831,213 | 8/1974 | Bedi | 10/10 |
| 4,063,980 | 12/1977 | Trunnell | 285/382 |
| 4,114,250 | 9/1978 | Dent | 29/517 |
| 4,330,924 | 5/1982 | Kushner et al. | 285/382.2 |
| 4,482,174 | 11/1984 | Puri | 285/382.2 |
| 4,624,489 | 11/1986 | Nakamura | 285/382 |
| 4,705,302 | 11/1987 | Beiley | 285/382.2 |
| 5,083,821 | 1/1992 | Friend | 285/355 |
| 5,122,020 | 6/1992 | Bedi | 39/30 |
| 5,219,186 | 6/1993 | Hosseinian et al. | 285/382.2 |
| 5,347,701 | 9/1994 | Hosseinian et al. | 29/520 |

FOREIGN PATENT DOCUMENTS 1399047 6/1975 United Kingdom ............ 285/382.2

*Primary Examiner*—Eric K. Nicholson
*Attorney, Agent, or Firm*—Ronald M. Goldman; John P. Scholl

[57] ABSTRACT

A relatively impervious mechanical seal is formed between the outer surface of a tube and the inside surface of a mechanical fitting of a high pressure fluid or hydraulic system by applying a very thin soft metal layer onto the outer surface of the hard metal tube and/or inner surface of the hard metal fitting, prior to swaging the fitting onto the tube. The thickness of such thin metal layer is independent of the size of the tube and/or fittings. Many metals and alloys of those metals exhibit the requisite softness, including silver, gold, nickel, tin, platinum, indium, rhodium and cadmium. Suitably, the coating is about 0.0025 millimeters (0.10 mils) in thickness. After swaging, the tube and fitting combination exhibits very low leak rates on the order or $10^{-8}$ cubic centimeters per second or less as meaured using the Helium leak test.

18 Claims, 1 Drawing Sheet

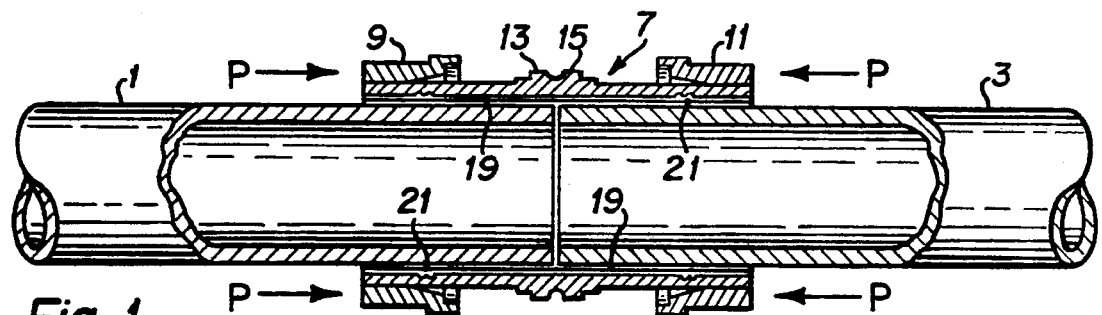
Fig_1
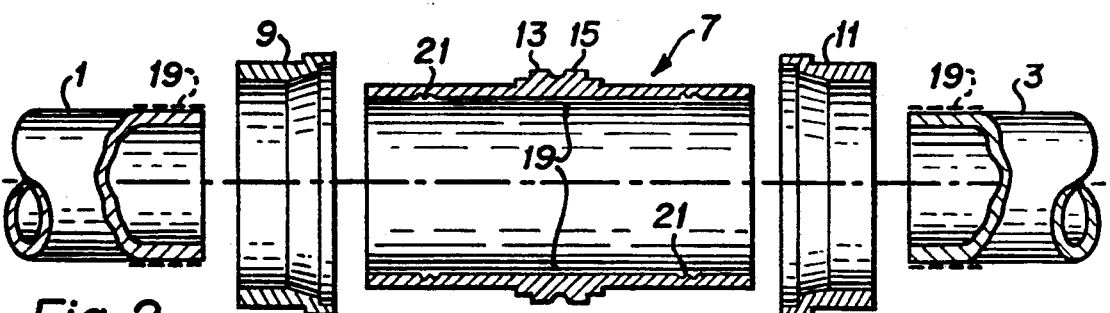
Fig_2
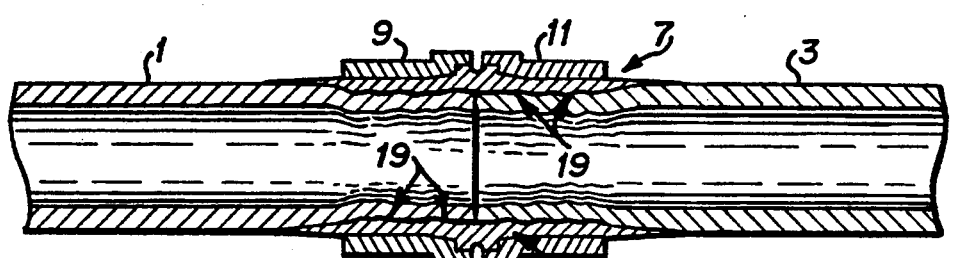
Fig_3
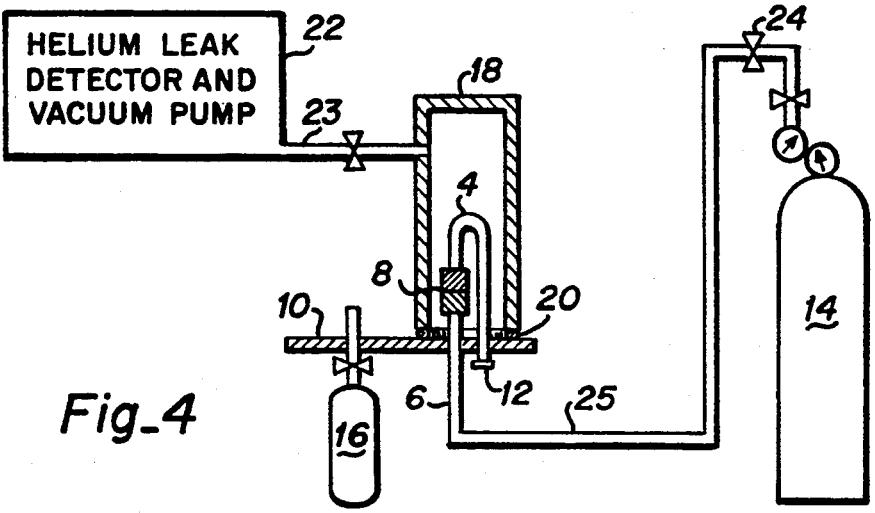
Fig_4

HIGH PRESSURE MECHANICAL SEAL

The invention described herein was made in the performance of NASA contract NAS 9-18200 and is subject to the provisions of the National Aeronautics and Space Act of 1958 (42 U.S.C. 2457).

FIELD OF THE INVENTION

This invention relates to high pressure fluid line joints and, more particularly, to an improved sealed connection between the fitting and fluid line having a low leakage characteristic; and also relates to the method of fabricating that joint.

BACKGROUND

Swaging, mechanically squeezing a fitting onto a tube, is a known technique for joining mechanical fittings onto tubes found in high pressure fluid systems. The construction of high pressure fluid systems, those operating above one hundred psig, often requires use of such mechanical fittings to join tube sections together in a mechanical swaging process in circumstances in which other techniques, such as welding, brazing, or soldering, cannot be used. In the aerospace field a variety of different mechanical fittings are available for that application and, while relatively impervious, all leak to some slight degree.

Typically the smallest leak rate achieved with such mechanical fittings, as swaged to the fluid line and using Helium as the pressurizing medium, is $10^{-6}$ cubic centimeters per second. It is found that the leakage is even greater when the outside of the tube lines are covered with a hard metal plating material, such as nickel or chrome. In the latter case good seals with leak rates of $10^{-6}$ cubic centimeters per second, or less, cannot be achieved, which is believed to be principally due to the inability of the hard metal plating to deform during the fitting swaging process. Although a leak rate of $10^{-6}$ cc per second is acceptable in practice, it is found in aircraft, as example, after some period in service, the leakage rate of some fittings increases, often rising to unacceptable levels. That increase may be attributed to the harsh aircraft environment, particularly, the adverse effect of temperature cycling, sustained or cyclic pressure, and vibration acting on the fittings.

Fluid leaks in those aircraft fluid systems are repaired when the aircraft returns to base. Such leaks often prove difficult and costly to repair, due to having poor access to the location of the leak in the aircraft. For permanent space station application locating and repairing a major leak in a fluid system requires major effort; a situation that should be avoided if at all possible. The obvious manner of avoiding that difficult situation is to eliminate the use of mechanical fittings in fluid systems for space application, a prohibitively expensive alternative and, hence, impractical. Welding is not as yet an acceptable practice for making repairs in the outer space environment. As a consequence, mechanical fittings remain a practical necessity both for initial fabrication and repair.

The present invention solves the problem of achieving the required low leak rate standard for fluid lines, by providing significantly lower initial leakage rates than is available with prior constructions of mechanical fittings. The improvement is achieved with a slight inexpensive modification to the structure of the standard mechanical fittings and/or tubing. The improved sealing is attained on nickel, chrome or any other hard plated metal surface as well as on the conventional titanium, aluminum, stainless steel, inconel and monel tubing.

As further background it is noted that the use of welding as a means of providing an impervious connection or joint between tubes in high pressure systems is a known alternative coupling or joining technique. However, the present invention is premised on the avoidance of any welds or welding process. Welding is avoided as a repair technique in difficult to work environments. The use of wet solder is also known as a means to join tubing together. However, although soldered joints are useful in low pressure water and gas plumbing systems, they fail in high pressure fluid systems. Even though the principal advantage of the invention and motivation for the invention is in high pressure hydraulic and fluid systems, it is recognized that the invention is not so limited in application. It may also be employed in low pressure systems as an alternative to existing joining techniques.

An object of the invention, therefore, is to provide a mechanical seal of high integrity for high pressure fluid systems;

Another object is to provide a high pressure mechanical seal that is applied by a swaging process;

A further object of the invention is to convert existing mechanical fittings, found to have leak rates of $10^{-6}$ cubic centimeters per second or less, as measured using Helium, into higher quality fittings that have leak rates of only $10^{-8}$ cubic centimeters per second or less; and An additional object of the invention is to provide a mechanical seal structure which exhibits leakage that does not exceed a leakage rate on the order of $10^{-8}$ cubic centimeters per second or better without the necessity and expense of materially changing the mechanical design and size of existing fittings and tubes.

SUMMARY OF THE INVENTION

In accordance with the present invention the outer surface of the metal tube and/or the inner surface of a standard swage mechanical fitting, which are formed of hard metals, is covered with a very thin layer of a soft metal, integral therewith, prior to swaging the fitting onto the tube. Suitably the soft metal layer is very thin, essentially 0.0025 millimeters (0.10 mils) in thickness, and is independent of the thickness or diameter of the tube and fitting. The soft metal layer's thickness desirably falls within the range of normal engineering tolerances in dimensions for such fittings and tubes, which typically is 0.25 millimeters (ten mils).

Such soft metal may be formed of silver, gold, platinum, tin, rhodium, indium, cadmium and many other soft metals. In accordance with a practical aspect of the invention, the fitting may comprise any standard hard metal material, such as aluminum, stainless steel and/or titanium, and the tube may comprise the same metals used in the fitting as well as alloys Inconel and Monel, and may even be a tube that is nickel or chrome plated. The soft metal is applied to the tube and/or fitting by any standard plating process or by any other available standard production processes.

Upon swaging the fitting onto the tube, a process in which the fitting is mechanically squeezed and permanently deformed by radial forces to reduce the diameter of the fitting and press the inner surface of the fitting against the outer surface of the tube, with the soft metal layer in place a connection or joint is completed between the fitting and tube that produces a more impervious seal between those elements. Not only is the mechanical seal better upon initial fabrication, it is also more reliable over periods of time in service. The joint is able to maintain its low leak characteristic following thermal cycling and/or vibrational and mechanical loading, thereby improving reliability over many prior joint structures, which often exhibit increased leak rates following only a limited number of thermal or mechanical cycles.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

BRIEF DESCRIPTION OF THE DRAWINGS

In the Drawings:

FIG. 1 illustrates pictorially in section an embodiment of the invention with the elements positioned in mating engagement prior to swaging;

FIG. 2 is a pictorial exploded partial section view illustrating several elements of FIG. 1 more clearly, including the thin metal layer and its application to alternative elements of that embodiment;

FIG. 3 is a partial section of the embodiment of FIG. 1 following swaging, showing the final relationship of the elements including the formed mechanical seal; and FIG. 4 illustrates a helium leak test arrangement used to check the integrity of the embodiments of the invention.

DETAILED DESCRIPTION OF THE PREFERRED EMBODIMENTS

Reference is made to FIG. 1 which shows the fluid line in section, pictorially, with the elements positioned ready for swaging, comprising tubes 1 and 3, coaxially arranged end to end and defining a fluid passage, which are formed of Stainless Steel or any other metal tube material, and a metal fitting, including a fitting sleeve 7 and two fitting rings 9 and 11, as is conventional, formed of Titanium or any other hard metal material conventional for a fitting. The fitting is mounted to tubes 1 and 3, and bridges the confronting ends of the adjacent tubes 1 and 3.

Sleeve 7 is of a generally cylindrical geometry that fits over the ends of tubes 1 and 3, bridging those sections of the fluid line. The sleeve is tapered to provide a section at each of the right and left ends that is of reduced outer diameter. The sleeve also contains a pair of integral rings 13 and 15 protruding from the outer surface and a pair of spaced apart grooves 21 in its inner surface, only one of which is labeled, circumscribing the inner surface, which are of conventional structure and function. Each ring is also generally cylindrical in shape, containing an internal generally cylindrical geometry that initially fits over the tube and the reduced diameter portion of the sleeve, prior to swaging, an outwardly tapered conical section adjacent the front of the ring that fits over the indentation in sleeve 7, prior to swaging, and a still larger internal cylindrical section at the front end, which is adapted to receive one of the sleeve rings that protrude from the outer surface of sleeve 7. Rings 9 and 11 are oriented in the assembly with the front ends facing one another. The sleeve and rings are of conventional structure. Those familiar with swage fittings should recognize the structure as a bare titanium "Aeroquip Rynglok" brand swage fitting, obtained from the Aeroquip Corporation of Jackson, Mich.

Either the inside diameter of fitting 7 or the outside diameter of tubes 1 and 3 carry a thin soft metal coating 19, suitably of Tin or other soft metal, which is applied by any conventional technique, suitably by a standard plating processes. This is better illustrated in FIG. 2, to which brief reference is made, illustrating the elements, in somewhat of an exploded view, prior to assembly in the mating engagement presented in FIG. 1 where the assembly was ready for swaging. The thin metal layer 19 is represented by the thick solid black line. The spacing between the layer and the adjacent surface that supports the thin layer is for purposes of illustration only, permitting better illustration of that metal layer. The correct physical relationship is as described by the text of this specification.

In a first embodiment, the thin metal layer may be located on the end portions of tubes 1 and 3, extending axially rearwardly away from the tubes end a short distance. Alternatively, in another embodiment, the thin metal layer 19 is located on the inside cylindrical wall of fitting 7, and extends substantially the length of the fitting. Although it is possible and within the scope of the invention to apply an even thinner layer to each of the tubes and fitting, such is not believed to be cost effective or necessary and so is not preferred.

The plating of the soft metal coating is accomplished by either plating in an electrolysis plating bath, which is initially preferred, or by brush plating, which are known processes. It may also be applied to the fitting and/or tube by any other known commercial processes as well, such as vacuum deposition or plasma spraying. The soft metal layer is plated onto the tube to a thickness of 0.0025 millimeters (0.10 mils). In the illustrated combination the soft metal plating is located intermediate the fitting element and the outer tube surface. Upon completion of swaging the metal layer is essentially deformed between those two elements.

Returning to FIG. 1, the sealing connection between the fitting and tube is formed in a mechanical swaging process, a known technique. As shown in the figure, the outer surface of the tube is plated with the soft metal. That same soft metal may also be plated on the inside of the swage fitting as well if desired. Thereafter, for swaging, the fitting is placed on the tube overlying the plating. Each fitting ring is mounted on the tube, the fitting sleeve is placed over the tube ends and the rings are then moved longitudinally along the axis of the tubes to the position overlying a portion of the fitting sleeve. Then the fitting is compressed or swaged onto the tube, resulting in a frictional fit there between, specifically forcing fitting ring 9 to the right and fitting ring 11 to the left, as indicated by the arrows P in FIG. 1, until the rings engage and lock to sleeve rings 13 and 15 respectively. As the rings are moved it squeezes the larger diameter portion of the sleeve within the smaller diameter internal cylindrical section of the ring, and compresses the fitting sleeve.

Swaging places a radial compressive squeezing force on the fitting that yields the inner fitting surface. That action reduces the diameter of its inner surface pressing it against the intermediate layer and there through onto the tube. Hence when the compressive swagging force is withdrawn, the fitting retains its new shape pressed tightly onto the tube and the two tubes remain permanently joined.

Following swaging, the formed joint appears in section as presented in FIG. 3, in which the elements described are given the same numerical designation as in FIG. 1. As shown in the figure the soft thin metal layer 19 is deformed as is as a portion of the tube. Since the intermediate metal layer is softer in physical characteristic than either the tube or fitting, portions of that soft metal layer are flowed or moved into any vacant areas, interstitial space, scratches, pores, however slight, as may be found to exist between the fitting and tube.

The invention provides extremely leak tight joints. It succeeds in application to tubing that has been plated with hard metal coatings, such as chrome or nickel, where all standard fittings would fail to meet a leak requirement of no greater than $10^{-6}$ cc/sec with the Helium leak test. It maintains acceptable levels of leak resistance in service better than the present mechanical fittings. It may be employed with any mechanical fitting and tube combination. To great advantage industrially, the mechanical dimensions of existing fittings are not required to be modified, because the soft metal coating is extremely thin, falling within the normal dimensional tolerance variation acceptable for the elements, thereby avoiding the expense of redesigning fitting dimensions and the accompanying engineering drawings. In this respect, existing fittings and tubes are easily converted to the form required by this invention to provide a higher quality fitting.

In a practical embodiment of the invention a bare titanium "Aeroquip Rynglok" brand swage fitting, obtained from the Aeroquip Corporation of Jackson, Mich., was swaged onto a nickel plated stainless steel tube that had the appropriate portion of the outer surface plated with a 0.0025 millimeter (0.10 mil) thickness of tin plate. The measured leakage using the Helium leak test medium was less than $10^{-8}$ cubic centimeters per second, an improvement in leak rate of 100,000 over the prior $10^{-3}$ cubic centimeters per second rate. In effect the soft metal coating appears to fill any microscopic interstitial space or leak gaps between the tube and fitting, analgous to the action of pipe thread filler in low pressure fluid systems.

It is also appreciated that the layer thickness that proved satisfactory result in the foregoing embodiment could be varied to some degree, either greater or less, but the appropriate range for any particular metal has not as yet been experimentally determined. Effectively, any degree of thinness that attains a like or better result may be used in accordance with the present invention.

Although the thin soft metal coating was applied to the tube in the preceeding embodiment, it is recognized that such coating may instead be applied to the inner surface of the fitting with the same result achieved in the combination. Further such coating may be applied in two parts, one of which is applied onto the outer surface of the tube and the other of which is applied onto the inner surface of the fitting to the same effect. All of the foregoing alternatives are encompassed within the invention.

In the foregoing description reference is made to metals which are hard and those which are soft and examples of each were given. However, that is not intended to exhaust the list of all possible metals and alloys which are either hard or soft, recognizing that no objective standard of hardness is presented, except that which is gleaned from the foregoing examples. Essentially the metal applied as the sealing layer should not be as hard as the supporting fitting or tube, respectively, in the sense that the sealing layer gives way or mechanically flows when subjected to the swaging force, before the supporting surface in which event the latter surface is deemed to be hard and the sealing surface layer is deemed to be soft.

In addition to tin, earlier discussed, it is believed that other metals are suitably soft and useful in the combination, as example, any of silver, gold, tin, platinum, indium, rhodium, zinc, copper and cadmium as well as alloys of such metals. The specific metal or alloy is selected to have the appropriate coefficient of expansion to ensure that the seal is maintained at the temperature or temperature range to which the fluid system is subjected in its intended application. That is, the fluid system may be one intended to be maintained in operation at cold temperatures, particularly cryogenic temperatures, or one that is used at elevated temperatures, or in an application in which the fluid system cycles between warm and cold temperatures. The state of Applicant's knowledge on the novel technology does not permit adequate selection theory on such refinements to the invention, except to suggest case by case trial and error. However, it is anticipated that others, given this description, through experiment, will find other specific metals that have such hard and soft relationship and thickness acceptable for the combination as described and for the specific application, whether cryongenic temperatures, high temperatures and/or applications in which the temperature cycles between a high and low temperature.

It is also recognized that some of the other soft metal materials given in the preceding description will react with certain chemicals. Hence in defining a particular joint structure, adequate attention is taken to ensure that the metal or alloy selected for the soft thin metal layer does not react with the fluid or gas in the intended fluid system application. As example the fluid line formed by tubes 1 and 3 in the embodiment of FIGS. 1 and 2 using gold as the soft metal, may be used to carry oxygen, a gas, at pressures of 3,000 pounds per square inch or greater, since oxygen does not adversly react with gold.

The foregoing leak rates have been presented in terms of the known helium leak test standard. That test is a standard for establishing leak rates that is well recognized and is extensively used by those engaged in leak testing. With the exception of hydrogen gas, the molecules of helium are smaller than other gases and liquids. Hence helium represents a more severe condition than is actually encountered in practice by other gases, such as Oxygen, and fluids.

Although those skilled in the art are knowledgable in pressure testing and, particularly in the Helium leak test, as an endnote for the benefit of other readers, a description of the test set up may be helpful. As shown symbolically in FIG. 4, a 9.53 millimeter ($\frac{3}{8}$th inch) outside diameter stainless steel tube 4, 61 centimeters (24 inches) in length and 0.89 millimeters (0.035 inch) wall thickness, is formed with a bend located about 10 centimeters (four inches) from the end, with the bend diameter being approximately 7.6 centimeters (three inches). The tube was attached to an 20.3 centimeter (eight inch) length of the same tubing 6 by a mechanical tube fitting 8. The fittings were attached using the Enerpak P-142 fitting attachment device that is supplied by the manufacturer with the Rynglok brand fittings. The assembled fitting was mounted on a steel plate with the fitting 8 located on one side and the tube ends located on the opposite side of the steel plate. The through holes on the mounting plate were sealed and the tube ends were flared at thirty seven degrees with AN nuts and sleeves 12 and plumbed into a high pressure helium tank 14, containing standard pressure relief valves and other customary valves. A $10^{-8}$ standard helium leak and a $10^{-6}$ standard helium leak 16 were attached to the mounting plate. A stainless steel movable vacuum chamber 18 having a butyl rubber "O" ring 20 on the bottom rim end was attached to a CEC model 24-120B helium leak detector and roughing pump 22.

The tube fittings were pressurized to 3,000 psi with helium. The vacuum chamber was placed over the standard leaks, and a vacuum was pulled on the chamber with the roughing pump. The standard leaks were then measured with the helium leak detector. Leakage values for the fitting 8 was calculated by taking the ratio of the fitting reading to the nearest standard leak reading and multiplying that by the standard leak value.

Although the present invention is particularly useful for space applications, as those skilled in the art appreciate, because of the minor additional cost involved, it can also serve in the more mundane applications in aircraft, in chemical processing industries and the like since the greater reliability of the seal technique serves to reduce maintenance costs and downtime. As those skilled in the art appreciate, the improved joint achieves low leak rates without use of any elastomeric seals, which is an advantage.

Fittings with metal seals can be subjected to a larger range of temperatures than seals that incorporate organic elastomeric materials, such as rubber, and the metal seals can be subjected to higher temperatures and lower temperatures than organic ones. These are not temperatures above 500 degrees Centigrade (932 degrees Fahrenheit), but the more modest temperatures used in the chemical processing industries for which the present invention is useful. Gold, as example, has a relatively high melting temperature, and can function at higher temperatures than elastomeric seals. Typically for most elastomeric compounds, excepting silicone, the minimum temperature at which the compound may effectively be used is between $-40$ to $-51$ degrees Centigrade ($-40$ to $-60$ degrees Fahrenheit).

Further, many fluids and gases are not compatible with elastomers. Gold, as example of a soft metal, is inert to all but a very few chemicals. Consequently those joint assemblies in which gold is selected as the soft thin metal layer will have widest application for reliable operation with most fluids and gases and, hence, despite the slightly higher material cost, may be more preferable to tin used in the example earlier given.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. The method of making a relatively impervious mechanical seal connection between metal fluid transmission elements in a high pressure fluid plumbing system, said seal connection having a leak rate no greater that $10^{-8}$ cubic centimeters per second as initially formed, when measured with Helium at 3,000 psi pressure, said elements including a first element formed of a metal material defining a tube and a second element formed of a metal material defining a fitting connector adapted to be carried by said first element, comprising the steps of:

applying a thin metal layer between the surfaces of the first and second elements to form an integral assembly of said thin metal layer and at least one of said elements, said thin metal layer comprising a metal different from the metal material of said first and second elements and having the physical characteristic of being more soft than the metal material of said first and second elements; and wherein said thin metal layer is essentially of a thickness of 0.1 mil, irrespective of the thickness and size of either said first or second elements;

placing the elements together for swaging with one of said elements overlying the other and with said thin metal layer located therebetween;

swaging said elements to mechanically squeeze said second element onto said first element in a leak tight fit and provide a compressive force on said thin metal layer sufficient to deform said thin metal layer and flow portions thereof into any interstitial space between said first and second elements.

2. The method as defined in claim 1, wherein said thin metal layer is plated onto one of said elements.

3. The method as defined in claim 1, wherein said high pressure fluid system carries a predetermined fluid in a predetermined range of temperatures, and wherein said thin metal layer comprises a metal that is compatible with said fluid and said range of temperatures without material deterioration.

4. The method as defined in claim 1, wherein one of said metal elements comprises a swage fitting of a metal selected from the group consisting of stainless steel, aluminum and titanium.

5. The method as defined in claim 1, wherein said thin metal layer comprises a metal selected from the group consisting of silver, gold, nickel, tin, platinum, indium, rhodium, zinc, copper and cadmium.

6. The method as defined in claim 4, wherein said thin metal layer comprises a metal selected from the group consisting of silver, gold, nickel, tin, platinum, rhodium, indium, zinc, copper and cadmium.

7. The method as defined in claim 1, wherein said thin metal layer comprises a plating on said first element.

8. The method as defined in claim 1, wherein said thin metal layer comprises a plating on said second element.

9. The method of making a relatively impervious mechanical seal connection between metal fluid transmission elements in a high pressure fluid plumbing system, said seal connection having a leak rate no greater that $10^{-8}$ cubic centimeters per second as initially formed, when measured with Helium at 3,000 psi pressure, said elements including a first element formed of a metal material defining a tube and a second element formed of a metal material defining a fitting connector adapted to be carried by said first element, comprising the steps of:

applying a thin metal layer between the surfaces of the first and second elements to form an integral assembly of said thin metal layer and at least one of said elements, said thin metal layer comprising a metal different from the metal material of said first and second elements and having the physical characteristic of being more soft than the metal material of said first and second elements; and wherein said thin metal layer comprises a plating on said first element and further comprising a second thin metal layer comprising a plating on said second element, with said first and second metal layers being sandwiched together between said first and second elements and with the combined thickness of said first and second thin metal layers being no greater than 0.1 mil;

placing the elements together for swaging with one of said elements overlying the other and with said thin metal layer located therebetween;

swaging said elements to mechanically squeeze said second element onto said first element in a leak tight fit and provide a compressive force on said thin metal layer sufficient to deform said thin metal layer and flow portions thereof into any interstitial space between said first and second elements.

10. A fluid coupling having an initial leak rate on fabrication of less than $10^{-8}$ cubic centimeters per second as measured with a helium leak test at 3,000 psi pressure, comprising:

a tube of a first metal material of a predetermined hardness;

a swage fitting of a second metal material of another predetermined hardness;

said swage fitting having at least a portion of its surface located over said tube for exerting a compressive force in a radial direction toward the longitudinal axis of said tube;

a thin layer of a third metal material located intermediate said swage fitting and said tube; said third metal material being of a lesser hardness than said first or second metal materials, said thin layer, responsive to said compressive force, being deformed in shape to fill interstitial space between said tube and swage fitting and otherwise coupling said compressive force through to said tube; and wherein said thin metal layer comprises a thickness of 0.1 mil.

11. The invention as defined in claim 10 wherein said thin metal layer is applied to an outer surface of said tube.

12. The invention as defined in claim 10 wherein said thin metal layer is applied to an inner surface of said fitting.

13. The invention as defined in claim 10 wherein said thin metal layer comprises a metal selected from the group comprising: silver, gold, platinum, tin, indium, rhodium, zinc, copper and cadmium.

14. The invention as defined in claim 10 wherein said thin metal layer comprises an alloy of a metal selected from the group comprising: silver, gold, platinum, tin, indium, rhodium, zinc, copper and cadmium.

15. The invention as defined in claim 13 wherein said fitting comprises the metal titanium and said tube comprises the metal stainless steel.

16. The invention as defined in claim 14 wherein said tube comprises the metal selected from the group comprising: aluminum, stainless steel, titanium, Inconel and Monel.

17. A fluid coupling having an initial leak rate on fabrication of less than $10^{-8}$ cubic centimeters per second as measured with a helium leak test at 3,000 psi pressure, comprising:

a pair of coaxially oriented tubes of a first metal material of a predetermined hardness, said tubes with the ends thereof in contiguous relationship;

a swage fitting of a second metal material of another predetermined hardness;

said swage fitting having at least a portion of its surface located over said tubes and bridging the adjacent ends for exerting a compressive force in a radial direction toward the longitudinal axis of said tubes;

a thin layer of a third metal material located intermediate and in physical contact with said swage fitting and said tubes; said third metal material being of a lesser hardness than said first or second metal materials, said thin layer being deformed in shape, responsive to said compressive force, to fill interstitial space between said tubes and swage fitting and otherwise coupling said compressive force through to said tubes; said thin layer being of a thickness no greater than 0.1 mil.

18. The invention as defined in claim 17, wherein said thin metal layer comprises a metal selected from the group comprising: silver, gold, platinum, tin, indium, rhodium, zinc, copper and cadmium.

* * * * *